T. F. WILLIAMS.
MULTIPLYING TYPE WRITER.
APPLICATION FILED DEC. 21, 1912.
1,097,278.
Patented May 19, 1914.
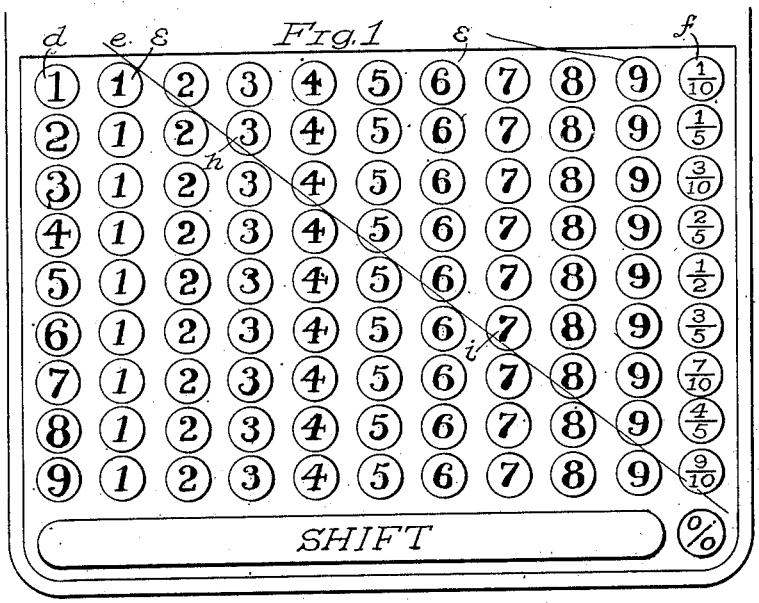
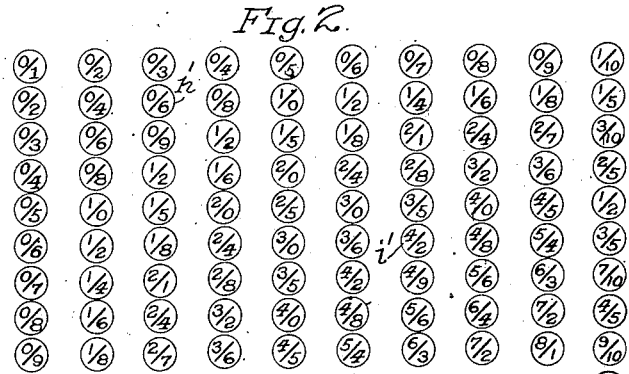
WITNESSES:
L. B. Gresham
F H Drury
INVENTOR:
Thomas F Williams
BY Jones Addington Ames Seibold
ATTYS.

UNITED STATES PATENT OFFICE.

THOMAS F. WILLIAMS, OF CHICAGO, ILLINOIS, ASSIGNOR OF ONE-HALF TO RICHARD NELSON, OF CHICAGO, ILLINOIS.

MULTIPLYING TYPE-WRITER.

1,097,278.  Specification of Letters Patent.  Patented May 19, 1914.

Application filed December 21, 1912. Serial No. 738,001.

*To all whom it may concern:*

Be it known that I, THOMAS F. WILLIAMS, a citizen of the United States, residing at Chicago, in the county of Cook and State of Illinois, have invented new and useful Improvements in Multiplying Type-Writers, of which the following is a full, clear, concise, and exact description, reference being had to the accompanying drawing, forming a part of this specification.

My invention relates to improvements in multiplying machines, and has for its object the production of a machine by the use of which all simple problems of multiplication may be clearly and correctly expressed in figures.

A further object is the production of a device by which by the simple addition of two figures only all ordinary results may be accurately obtained.

A further object is the production of a device of extremely simple construction and one that is not liable to disarrangement of parts.

These and such other objects as may hereinafter appear are attained by my device, an embodiment of which and illustrations of the results are shown in the accompanying drawings, in which—

Figure 1 represents a typical keyboard through the use of which my invention may be worked out; Fig. 2 presents in tabulated form a plan view of the faces of the respective type connected to the keys shown in Fig. 1 and in the same relative order; Fig. 3 represents three embodiments of another form of key showing on its face the figures appearing on its type; and Figs. 4 and 5 represent two problems for solving and the solutions as they will appear on the paper.

Like numerals of reference indicate like parts in the several figures of drawings.

Referring now to the drawings: In Fig. 1 I have illustrated a keyboard similar to that used in ordinary typewriters, with the ordinary shift key below as illustrated. The first vertical row of figures is either printed on immovable keys or printed on the side of the machine, and are for the purpose of designating the horizontal rows of movable keys, bearing the numbers 1 to 9 inclusive, and marked $d$. On the outside edge beyond the movable keys is also a series of immovable keys marked $f$, bearing the characters 1/10, 1/5, 3/10, etc., these representing the fractional portion of a unit that the corresponding line of keys stands for.

The keys $e$, eighty-one in number, are arranged in nine vertical and nine horizontal rows, the horizontal rows running from 1 to 9 and the vertical rows comprising nine 1's, nine 2's, nine 3's, etc., and are movable keys the same as on an ordinary typewriter, attached to which in any desired manner, (not shown) are type on the ends of type bars (not shown). The striking of an individual key, such, for instance, as the second key in the third row, designated $h$ would operate the type shown in Fig. 2 at $h'$ and would print 0/6 on the paper. The pressing down of the seventh key in the sixth row, designated $i$ would cause the type indicated at $i'$ to print, and 4/2 would appear on the paper. It is plain, therefore, that by striking any one of the eighty-one keys a result will be printed on the paper, the figures being separated by a mark (/) as shown in the illustrations given above. In the event, therefore, that it is desired to multiply seven by six, the seventh key in the sixth row or the sixth key in the seventh row may be pressed, the result in either case being the same, 4/2. When it is desired to multiply a number, for instance, 7285, by six, as illustrated in Fig. 4, the seventh key in the sixth row is first struck, which prints 4/2; next the second key in the sixth row is struck and prints 1/2; next the eighth key in the sixth row is struck, printing 4/8; and lastly, the fifth key in the sixth row which prints 3/0. The result will be as shown in Fig. 4 above the line $k$. The answer is then inserted in ink, 43710, and written commencing at the units, 0, then the sum of 8 and 3 being 11, 1 is written and 1 carried to the next column; 4 and 2 being added and one carried makes 7; one and two added is 3, and the first 4 is brought down, making the result as indicated.

In Fig. 4ª I have illustrated the result multiplying 3465213 by 7, it being necessary to strike successively 3465213 and combine the figures between the contiguous diagonal marks for the result, which will be 27,-721,704.

My device can be used to multiply a number consisting of various digits by a multiplier also having various digits with as much facility as though the multiplier was a single figure. For instance, if it is desired to multiply 9763 by 487 it is simply necessary to carry the multiplication through with the figure 4, the highest digit in the multiplier, first, then drop a line and commence one space to the right with the figure 8, as the multiplier, drop a line and commence one space to the right with the figure 7 as a multiplier, the result being as shown:

```
   3/  2/  2/  1/
    /6  /8  /4  /2
     7/  5/  4/  2/
      /2  /6  /8  /4
       6/  4/  4/  2/
        /3  /9  /2  /1
   ─────────────────────
    4  7  5  4  5  8  1
```

While I have shown results of several multiplications with similar units in diagonal columns, it is at once apparent that I am not limited to this form of record, as by using a type bar with a type showing a vertical line, the resulting record will appear on the paper with a vertical line between the numerals, or more strictly speaking, a vertical line after each numeral; thus in striking the fourth key of the third row the result, 12 will be indicated as follows: 1|2 and when the same key or another key is struck on the next line directly below the first impression, the vertical line following the upper character will be directly above the vertical line following the lower character, making the vertical line continuous, thus showing the result of the same multiplication as referred to above in the following form:

```
   3| 2| 2| 1|
   |6 |8 |4 |2
      7| 5| 4| 2|
      |2 |6 |8 |4
         6| 4| 4| 2|
         |3 |9 |2 |1
   ──────────────────
    4  7  5  4  5  8  1
```

In Fig. 3 I have illustrated several keys of an alternative type board in which the value of the type itself is shown on the face of the key as well as on the type connected therewith; for instance, in Fig. 3 at $a$ I have illustrated the fourth key in the third row; at Fig. 3, $b$ I have illustrated the fourth key in the ninth row, and at $c$, Fig. 3, the eighth key in the fourth row. It will be noted that in the key marked $a$ 1 appears in the upper left hand corner, and 2 in the lower right hand corner, corresponding to 12, or four times three; at $b$ 3 appears in the upper left hand corner and 6 in the lower right hand corner, or 36, corresponding to four times nine, and at $c$ 3 appears in the upper left hand corner and 2 in the lower right hand corner, or 32, eight times four.

The advantage of having the last row of immovable keys or numerals is that of quickly calling the attention of the operator to the fractional value of the row; for instance, the sixth row representing 6/10, or 3/5 as shown, the second row representing 2/10 or 1/5 as shown. That is, for instance, the keys on the second row multiply by two, the number of the row, and also by 1/5; the keys on the fifth row multiply by 5 and also by 1/2, it being understood of course that the 1/5 is the same as 2/10 or .2, and the 1/2 the same as 5/10 or .5.

The number shown on the key in the forms illustrated in Fig. 3, or the resulting number printed by pressing down the key, is always a number which is a multiple of the number on the key that operates it. Each type, therefore, prints the product of the number on the key that operates it multiplied by the number of the row in which the key is. By means of a shift, as in ordinary typewriters, one row of keys may be made to operate more than one row of type, thus reducing the number of keys if so desired.

It is evident, of course, that I could if desired dispense with half of the keyboard, that is, the upper right hand half running diagonally above and to the right of the line $c$. This is apparent, as if one desires to strike the sixth key in the third row the same result is attained by striking the third key in the sixth row, or if it is desired to strike the ninth key in the sixth row, the same result is attained by striking the sixth key in the ninth row. It is also apparent that I do not limit myself to prices in which single figures only are used successively, but my device is adapted for uses in which large multiplicands can be provided for. For instance, an index number 75 at the side might be provided in which case the striking of the horizontal row of keys from 1 to 9 will print successively 75, 150, 225, 300, 375, 450, 525, 600 and 675. A zero key is also provided as shown in Fig. 2 preferably at the lower right hand corner, but as this is the same regardless of the index number, one key only is provided. In the event that it was desired, for instance, to multiply 489 by 75, it would simply be necessary to strike successively the key numbers 4, 8 and 9 in the 75 row, the result being as follows:

```
            |0 |0 |5 |
         |0 |0 |7 |
      |3 |6 |6 |
      ──────────────
       3  6  6  7  5
```

The total is arrived at by adding the diagonal lines making 36675 as shown above. It is understood, of course, that the result struck by each key is at an angle of substantially 45° to permit the figures to strike under each other. It is evident, however, that the figures could be struck at other angles, the angle being reckoned in connection with the horizontal or reading line. It is understood of course that the key numbers never change. The index numbers at the left hand side, however, may be varied to suit any business or requirement. For instance, in a factory where various wages per hour are paid, the index numbers could correspond to the rate per hour in which case the computation of the amount due the employees could be readily obtained by striking the proper keys. It is also evident that in some cases where only one or two numbers are used continuously, either large or small, the typewriter could be fitted with one or two extra rows of keys to cover the requirements of the business.

The device is an extremely simple device, can be very cheaply constructed, and do the work and take the place of many of the high priced machines, the price of which prevents their use in small business houses.

I claim:

1. In a machine of the class described, a plurality of movable type keys permanently arranged in respect to each other and disposed in vertical and horizontal rows, each key adapted to strike a number equal to the multiple of a number which said key represents, and a stationary index comprising a plurality of numbers which are factors of the multiple numbers, each index number being positioned in alinement with one of the rows of the type keys.

2. In a machine of the class described, a plurality of movable type keys permanently arranged in respect to each other and disposed in vertical and horizontal rows, each key adapted to strike a number equal to the multiple of a number which said key represents, and a stationary index comprising a plurality of numbers which are factors of the multiple numbers, each index number being positioned in alinement with one of the rows of the type keys, the multiple numbers on said type keys having dividing lines therebetween to separate the tens from the units and from columns of figures to be added.

3. In a machine of the class described, a plurality of movable type-keys permanently arranged with respect to each other, each key adapted to strike a number equal to the multiple of a number which said key represents, said multiple number comprising two figures spaced apart representing the tens and units respectively, whereby the resultant number obtained by striking several keys will be divided in separated groups, each group containing a ten and a unit struck from different keys.

In witness whereof, I have hereunto subscribed my name in the presence of two witnesses.

THOMAS F. WILLIAMS.

Witnesses:
F. H. DRURY,
CHARLES G. COPE.